Figure 1:
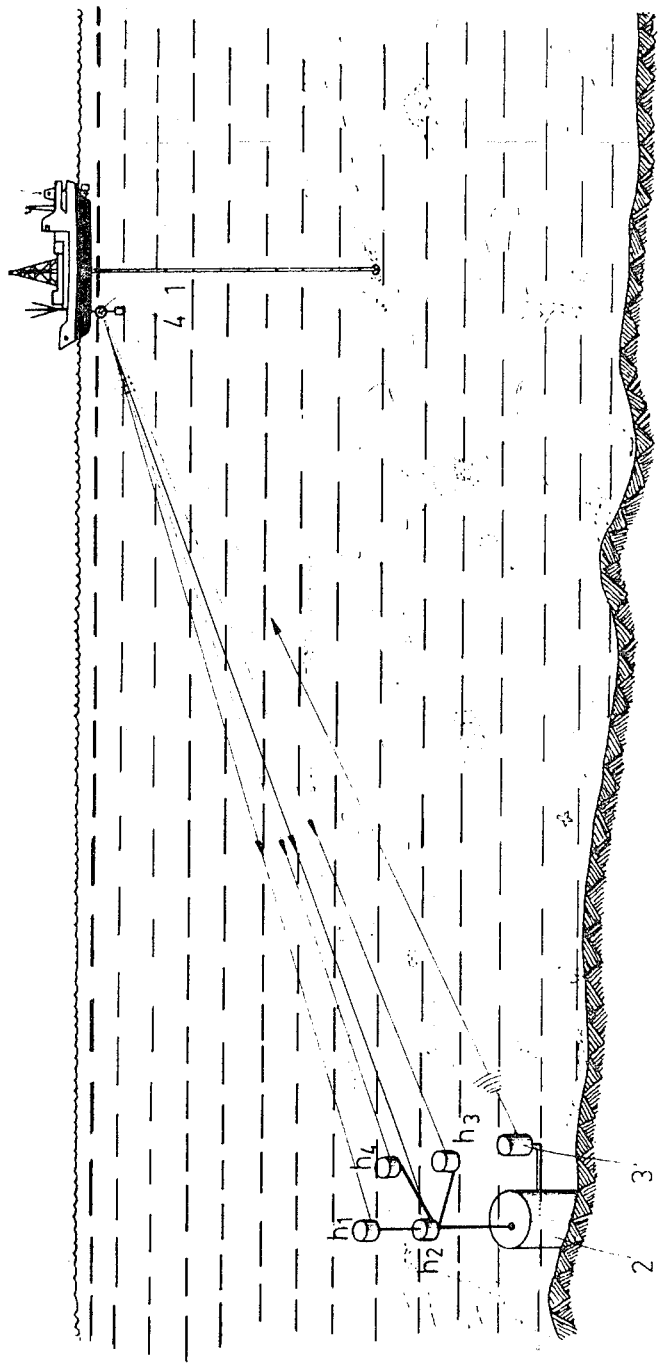

United States Patent [19]
Barret et al.

[11] 3,745,518
[45] July 10, 1973

[54] METHOD FOR DETERMINING THE DISTANCE BETWEEN A VESSEL AND A REFERENCE POINT AND DEVICE FOR CARRYING OUT THIS METHOD

[75] Inventors: Jean-Pierre Barret, Chambourcy; Jean-Francois Therond, Neuilly; Jacques Harbonn, Jouars Ponchartrain, all of France

[73] Assignee: Institut Francais au Petrole, des Carburants et Lubrifiants, Rueil-Malmaison, France

[22] Filed: Apr. 12, 1971

[21] Appl. No.: 132,977

[30] Foreign Application Priority Data
Apr. 15, 1970 France .............................. 7013718

[52] U.S. Cl. .................................. 340/3 E, 340/6 R
[51] Int. Cl. ................................................ G01s 3/80
[58] Field of Search ....................... 340/2, 3 E, 5 R, 340/6 R, 16 R

[56] References Cited
UNITED STATES PATENTS
3,421,138  1/1969  Moulin et al. .................... 340/6 R X Primary Examiner—Richard A. Farley
Attorney—Craig, Antonelli & Hill

[57] ABSTRACT

Method for determining the deviation distance of a vessel from a preselected point defined with respect to a set of sensors immersed in a predetermined position, comprising transmitting acoustic waves from said vessel, detecting the continuous phase differences between the waves received by said sensors by combining the output signals thereof with one another and/or with that of a reference sensor, converting said continuous variations to phase shift increments of constant value and transmitting in a coded form the number of said increments to a counter on the vessel.

18 Claims, 11 Drawing Figures

INVENTORS
JEAN-PIERRE BARRET,
JEAN-FRANÇOIS THERON and JACQUES HARBONN

By Craig, Antonelli + Hill
ATTORNEYS

METHOD FOR DETERMINING THE DISTANCE BETWEEN A VESSEL AND A REFERENCE POINT AND DEVICE FOR CARRYING OUT THIS METHOD

This invention relates to the positioning of a marine vehicle with respect to stationary points and more particularly to the maintenance thereof at a predetermined location.

The invention is particularly useful for the maintenance of a vessel or of a drilling platform in vertical alignment with a submerged well head at sea.

The maintenance of a vessel at a preselected stationary point is insured by the so-called "dynamic anchoring" consisting in maintaining in position or driving back to its initial position said vessel by means of propelling units. The deviation distances of the vessel are determined in most cases with respect to one or more stationary submerged points, by means of ultra-sonic waves or by using an inclinometer with a stretched wire. This device comprises a wire-stretched between a stationary submerged point and the vessel, together with means for detecting the magnitude and the direction of the inclinations of the wire in response to the shifting of the vessel with respect to a reference position.

The accuracy of the measurement achievable by a device of this type is smaller with an increasing water depth. At a relatively great depth, the curvature of the wire, by the effect of its weight is no longer negligible and its inclination, accordingly, is no longer proportional to the vessel deviation distance or drift.

The methods for determining the drift by means of ultrasonic waves, which are the most commonly used, consist in determining the propagation time of ultrasonic pulses between the vessel and reference points.

According to one embodiment, given by way of example, there is immersed at a known location a transducer transmitting ultrasonic pulses which are received for example at three hydrophones fixed at the three apices of a frame shaped as a right-angle triangle and attached to the hull of the vessel.

A computer on board determines the position of the vessel from the differences between the respective times of arrival of the pulses at the three hydrophones.

Reversely, other embodiments comprise transmitting ultra-sonic pulses from the vessel and receiving them by means of several submerged hydrophones maintained at stationary locations with respect to the sea bottom. The hydrophones are placed at the apices of a polyhedral frame laid on the sea bottom, or distributed at several known locations. The propagation times of the ultrasonic pulses are transmitted to the vessel, for example through surface buoys connected to the hydrophones and containing radio-electric transmitters.

The propagation times may also be determined by placing at known locations beacons carrying reflectors of different shapes and types which send back to the vessel echos which are specific of each one. The travel time forth and back of the pulses can be used for determining the distance of the vessel from each of the buoys.

The main disadvantage of the above-mentioned methods is in the difficulty of determining the times of arrival of the transmitted pulses, as a result of the strong jamming due to the noise generated by the vessel or the drilling platform and also to parasitic reflections which make unreliable the detection of the direct arrival of the pulses. Moreover the results of the computations on the basis of the travel time differences are given in term of absolute distance deviations which are not always easily used in an automatic or manual piloting device for driving the vessel back to its initial position.

It is an object of the invention to provide a method for maintaining a vessel at a predetermined location, according to which the position shifts are no longer determined from pulses but by measuring the variations of the phase shifts of a wave transmitted in a continuous manner and received at several hydrophones and according to which the position shifts are indicated by increments of quantified values easily workable.

The method according to the invention provides for the determination of the distance deviation of a vessel near a preselected position, with respect to an immersed reference location where are placed several pressure sensors laid in pre-determined position with respect to one another.

This method consists, first of all, of transmitting from the vehicle and in a continuous manner, acoustic waves which are received by sensors which convert the same to electric signals. When the vessel moves near the preselected position, the continuous variations of the phase shifts of the waves received by the sensors are then determined. Simultaneously there is achieved the combination of electric signals issued from at least one set of sensors comprising at least two pairs of sensors having one common sensor. These sensors are so arranged that the directions formed by these two pairs are not in line. The method of this invention provides for the determination of the vessel displacements in the vicinity of said initial position, without necessarily knowing the site and azimuth thereof with respect to the reference location.

For sake of convenience in carrying out the method, the continuous variations of the phase shifts are converted to a series of phase shift increments of constant value.

These increments are transmitted to a counter placed in the vehicle. The return of the latter to its initial position is achieved by driving it along convenient directions so as to nullify the accrued number of phase shift increments.

According to a first embodiment of the method, at least three pressure sensors are placed at the immersed reference location. Signals issued from at least two of the sensor pairs formed with the immersed sensors are combined by pairs.

According to a second preferred embodiment of the method, there are placed, in the vicinity of the immersed reference location, at least four sensor sets, each formed of several sensors placed substantially along a vertical direction and at evenly spaced levels.

The detectors of each level are thus in a substantially horizontal plane. The variations in the phase shifts of the received waves are then detected by combining, at each level, the signals respectively issued from two pairs of sensors which are not in line and have one common sensor, with the signals issued from a reference sensor.

This second embodiment is very easy to perform and makes possible to establish a correspondance between the phase shift increment unit and a relatively small surface displacement of the vessel, even when the water body is very deep. The deviations of the vessel are thus detected with a very good accuracy.

According to the method of the invention, the transfer, to the counter placed on the vehicle, of the number of detected phase shift increments, is performed by coded transmission of acoustic pulses, retransmitted from an immersed transducer and received by pressure sensors placed on the vehicle. This way of transmission is advantageous since it does not require more than a simple and cheap electronic apparatus. Moreover it is unnecessary to place the pressure sensor on a stabilized platform. The reception of the retransmitted pulses remains satisfactory in spite of the vessel displacement produced by the swell effect.

Figure 2:
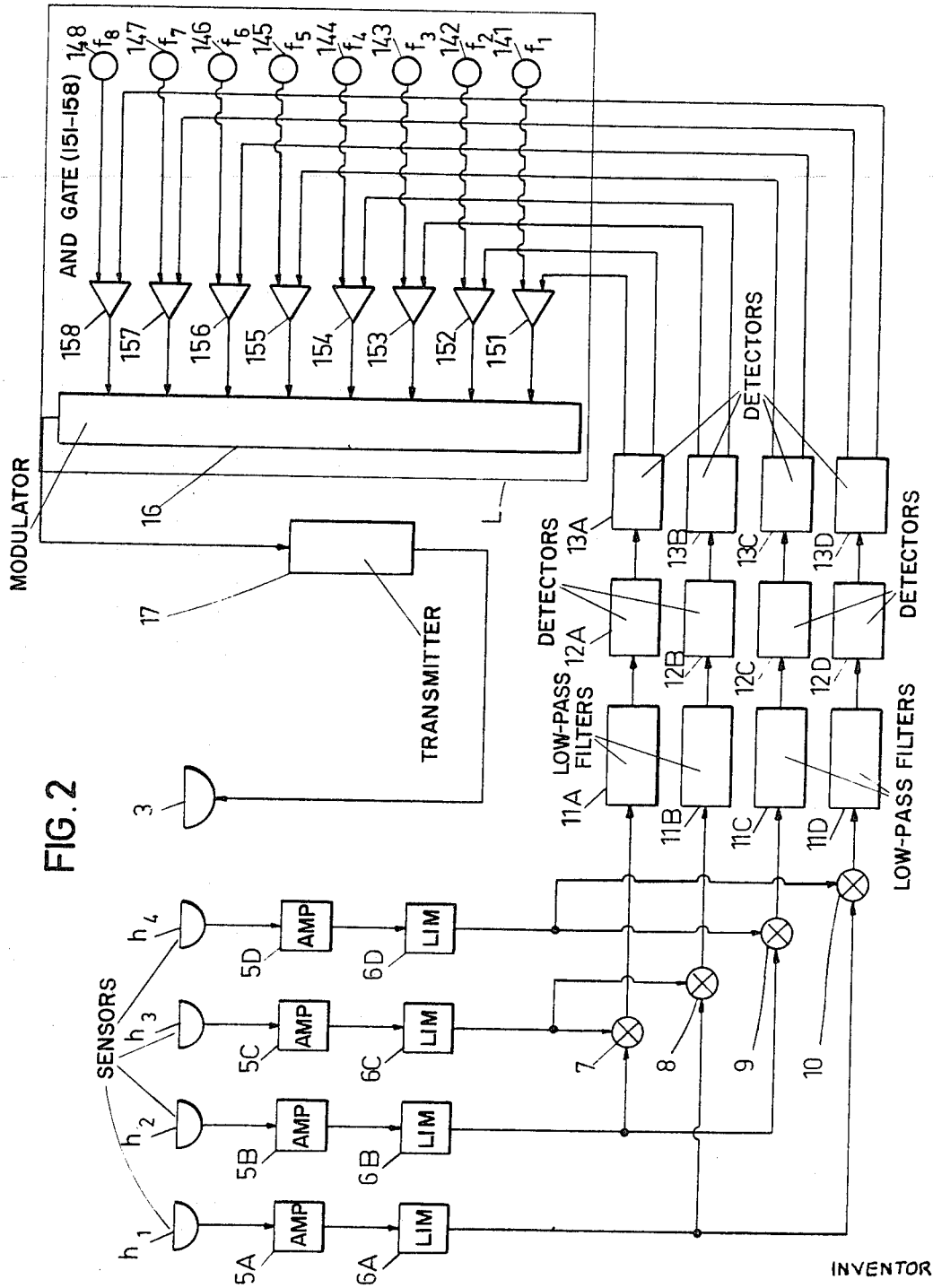
Figure 3:
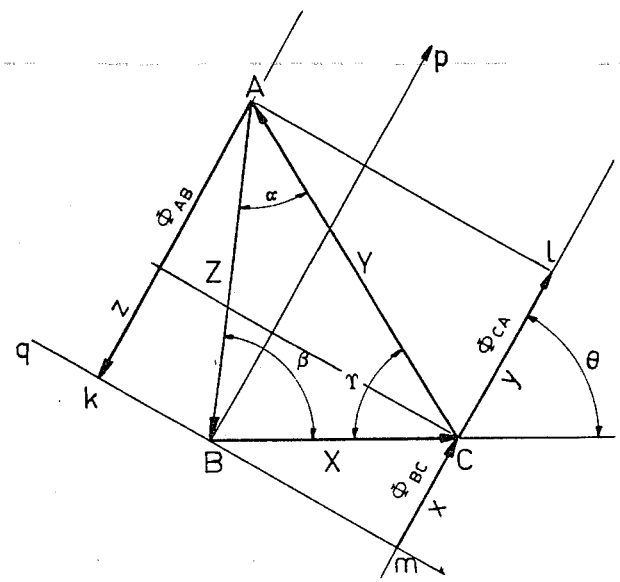
Figure 4:
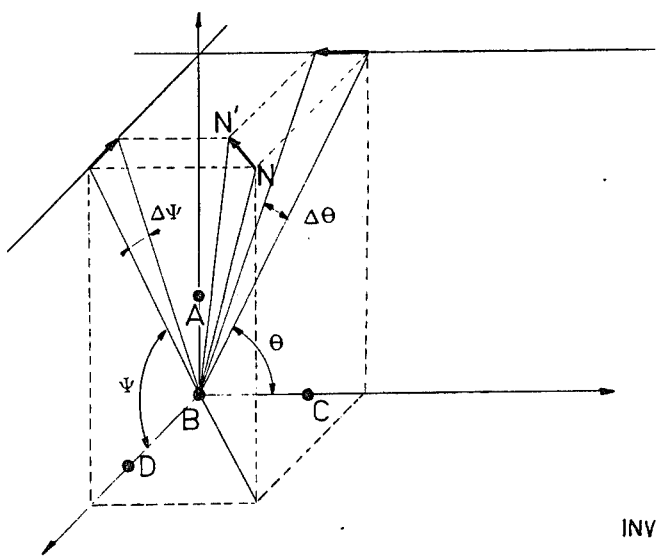
Figure 5:
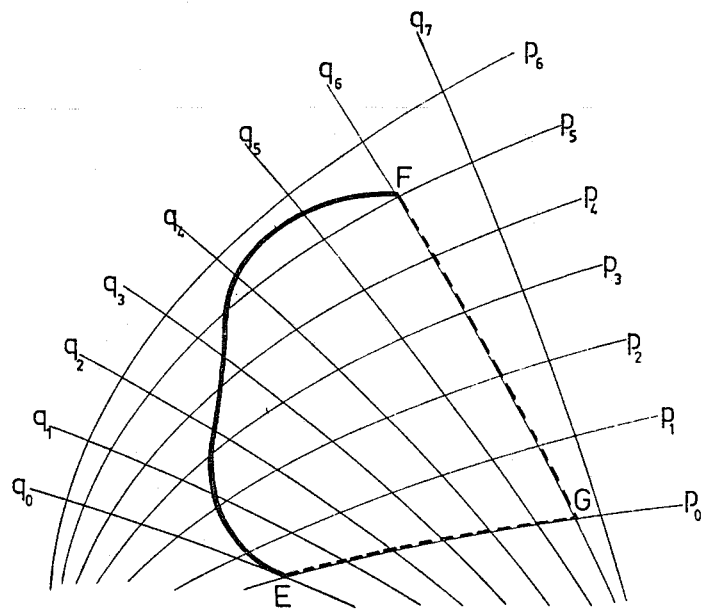
Figure 8:
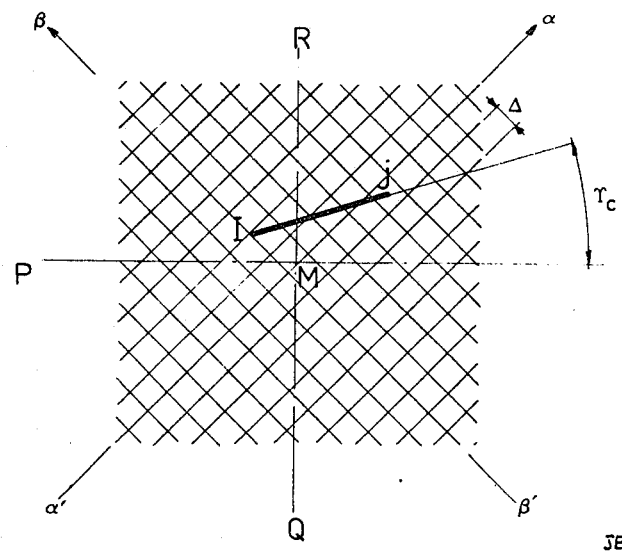
Figure 6:
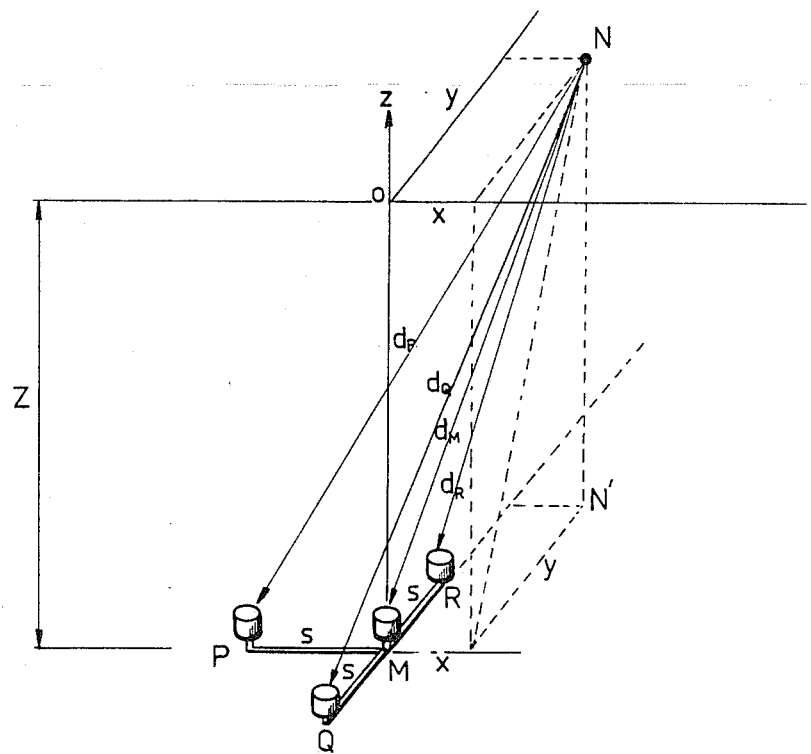
Figure 9:
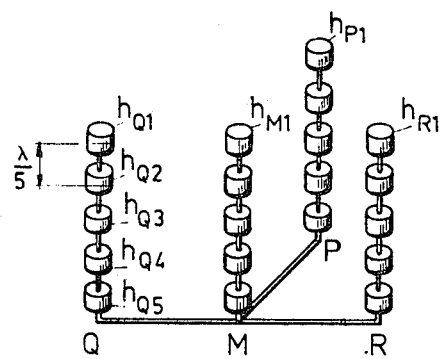
Figure 7:
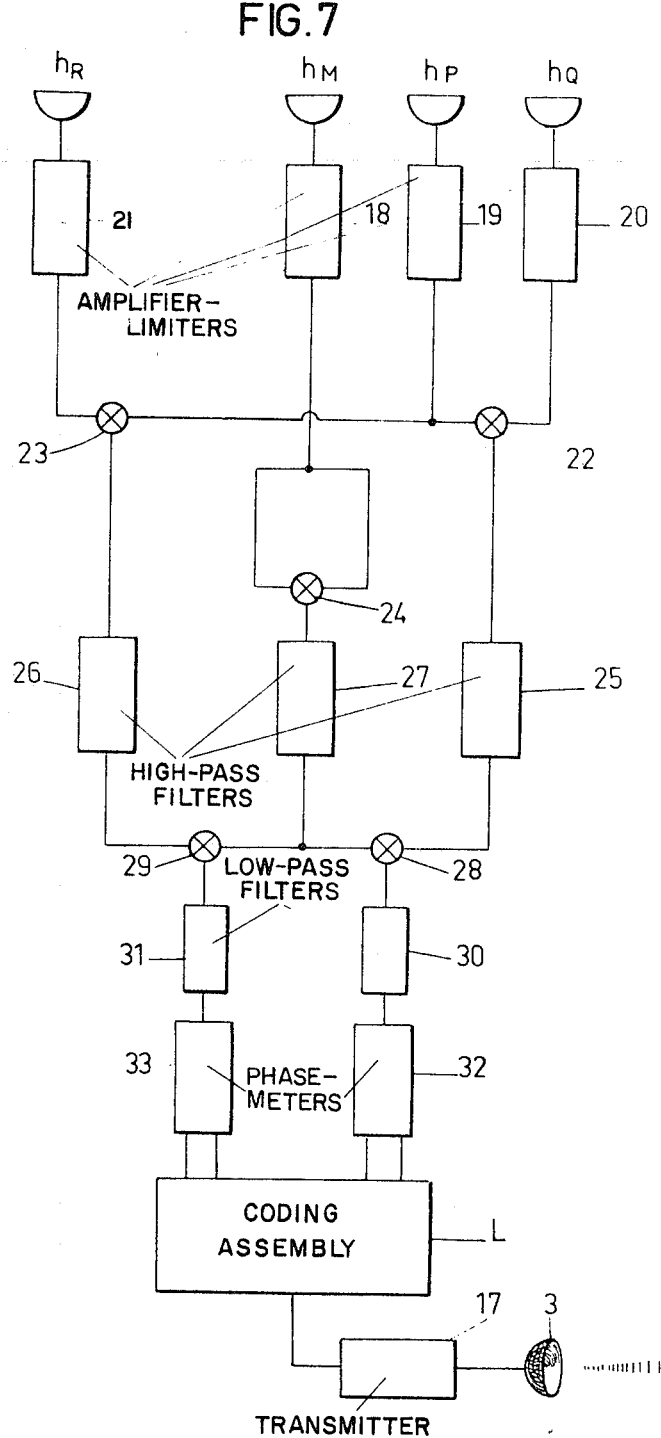
Figure 10:
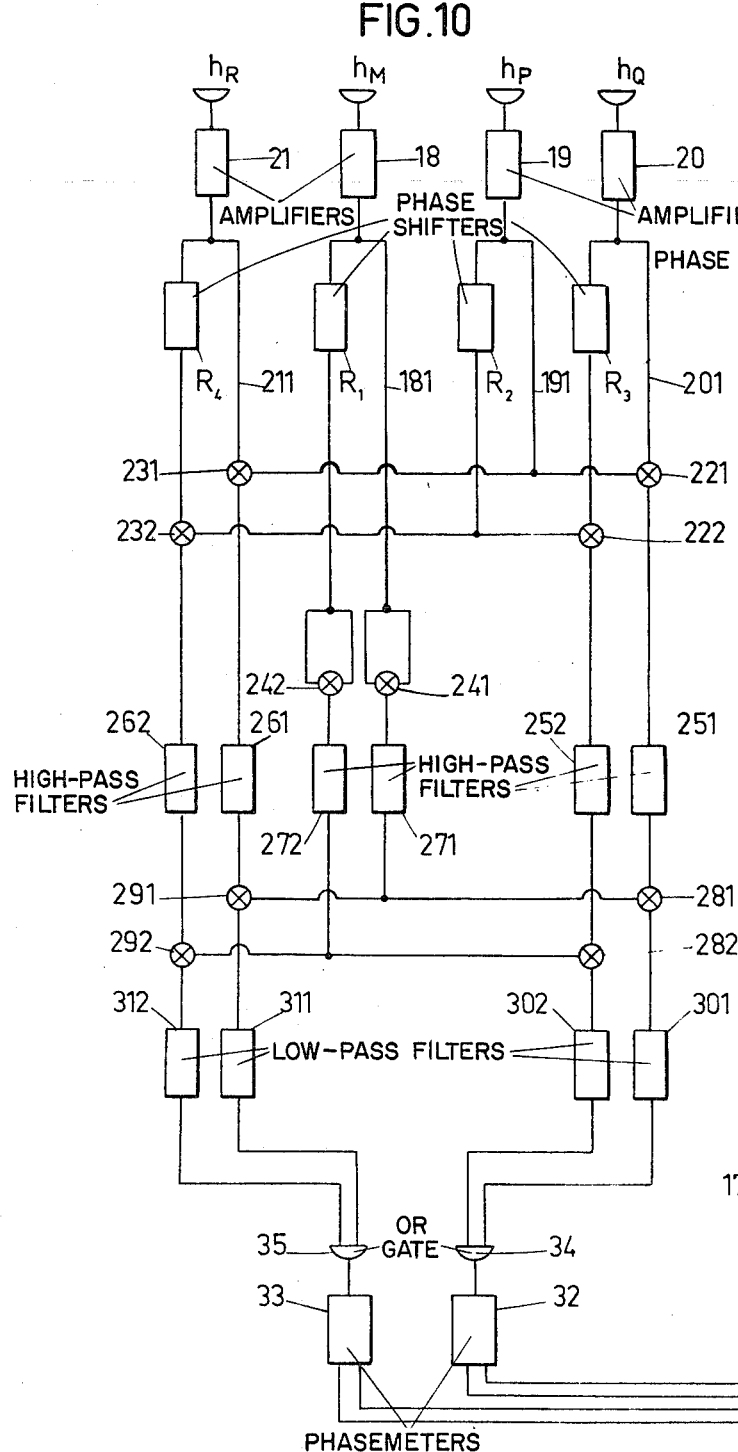
Figure 10A:
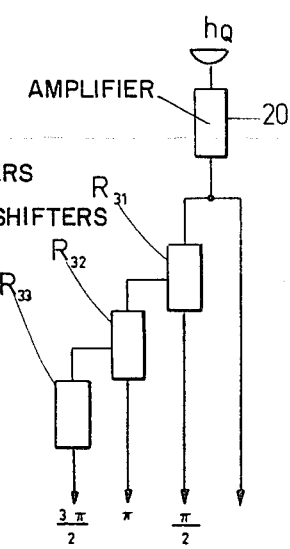

The characteristics and advantages of the method of the invention and of the device for performing the same will be better understood from the following detailed description of particular embodiments of the invention given by way of non-limitative examples and with reference to the accompanying drawings wherein:

FIG. 1 diagrammatically shows a vessel at a preselected location defined with respect to an immersed reference location where are placed four sensors, according to the first embodiment of the method, FIG. 2 diagrammatically shows a device for performing the first embodiment of the method, FIG. 3 shows the position of the system for receiving the continuous pressure waves in the particular case where the vessel is in the same plane, FIG. 4 shows the projections of the vessel displacement vector on the axes joining the pressure sensors, FIG. 5 shows, in the general case, the network formed by intersecting lines of equal phase shifts, for combinations of electric signals produced by separate sensor sets, FIG. 6 diagrammatically shows the vessel position with respect to a four-sensor set according to the second embodiment of the method, FIG. 7 shows a device for performing the second embodiment of the method, FIG. 8 shows the network of lines corresponding to equal phase differences, obtained by using the second embodiment of the method, FIG. 9 shows a particular arrangement of the sensors whereby a greater accuracy can be obtained by narrowing the network of lines corresponding to equal phase differences shown in FIG. 8, FIG. 10 shows a second embodiment of the device of FIG. 7 providing for a greater accuracy in the determination of the vessel position, and FIG. 11 A shows an arrangement of delaying elements in a third embodiment of the device of FIG. 7 whereby the accuracy can be increased.

As shown in FIG. 1, the vessel is provided with a device 1 transmitting ultra-sonic waves in a continuous manner at a frequency so selected as to make possible a penetration of the waves through several kilometers of the water body. The transmitted waves are received by a device of four sensors $h_1$, $h_2$, $h_3$ and $h_4$ arranged on a polyhedral frame maintaining them at predetermined positions with respect to one another. This frame is maintained vicinal to the water bottom by means of a beacon 2 lead on the bottom and previously immersed from the vessel.

According to another arrangement, not shown, the sensors may be, for example placed on a platform fixed to a cable stretched between a stationary fixation point on the bottom and a surface buoy.

The beacon is provided with an electronic apparatus hereinafter described, measuring the phase differences, transforming the same into electric pulses and converting them to coded ultra-sonic waves which are then retransmitted towards the vessel by means of a transducer 3. An omnidirectional hydrophone 4, suspended from the hull of the vessel, detects the retransmitted coded waves which are demultiplexed by means of a suitable device of a known type, not shown. The decoded phase increments may be supplied, for example, to a coordinate transformer of a known type producing increments in the direction of the axes related to the vessel, and then treated in a computer generating orders for controlling the propelling units so as to drive the vessel back to its initial position. By way of example there can be used the coordinate transformer described in U.S. Pat. No. 3,671,723.

In the device shown in FIG. 2, each pressure sensor $h_1$, $h_2$, $h_3$, $h_4$ is connected to an amplifier, respectively 5A, 5B, 5C, 5D. The four amplifiers amplify and filtrate the signals corresponding to the received continuous pressure waves within a band of sufficient width for taking into account the Doppler effect, when present. A known device for the gain control, either automatic or programmed, maintains at a constant value the signals at the input of the amplitude limiters 6 A, 6 B, 6 C and 6 D, connected respectively to the amplifiers 5 A, 5 B, 5 C, 5 D. These limiters clip the peaks of the signals and reduce the effect of the amplitude modulations generated by parasitic phenomena.

The sets of amplifiers 5 and limiters 6 are not a critical feature of the device. They can be replaced, for example, by logarithmic amplifiers or by phase control loops.

The amplified and clipped signals are then combined in a unit of voltage multipliers 7, 8, 9 and 10 of a known type, also called "synchroneous demodulators" or "phase comparators" or "balanced modulators" or "frequency changers". These multipliers are respectively connected to the outputs of limiters 6 B and 6 C, 6 A and 6 C, 6 B and 6 D, 6 A and 6 D.

These demodulators multiply the signals two by two, eliminate the high frequency components and restore the cosines of the low frequency signals. Each demodulator 7, 8, 9 and 10 is connected to a chain comprising a low-pass filter, respectively 11 A, 11 B, 11 C, and 11 D which eliminates the residues of high frequency modulation, a detector of the passage to zero of the signals amplitude, respectively 12 A, 12 B, 12 C and 12 D and a detector of the direction of variation of the amplitude of said signals where passing to a zero value, respectively 13 A, 13 B, 13 C and 13 D. Each detector produces a pulse at its first output terminal when the phase shift variation detected between the signals issuing from the corresponding sensor pair has increased by a preselected amount. In the opposite case, when the phase shift variation decreases by the same amount, each detector 13 produces at the second output terminal a decrease-indicating pulse. For sake of convenience the phase shift unit will be selected equal to $\pi$ or $2\pi$ radians.

The device further comprises an assembly for coding and retransmitting coded ultrasonic waves towards the vessel. According to a preferred embodiment the eight output terminals of the four detectors 13 A, 13 B, 13C and 13 D, are respectively connected to eight AND gates 151 to 158. The gates are also connected respectively to eight oscillators 141 to 148 tuned to eight frequencies $f_1$ to $f_8$ separate from one another. The output terminals of gates 15 are connected to a carrier frequency modulator 16, itself connected to a transmitter 17. A transducer 3 retransmits, in the form of ultrasonic waves, the signals which it receives from the transmitter 17.

The pulses indicating the phase shift increase or or decrease, generated by any one of detectors 13, open one of the two corresponding AND gates. Each of the frequencies $f_1$ to $f_8$, modulating the carrier frequency is thus indicative of a positive or a negative increment occurring on one of the channels corresponding to a well identified pair of sensors h. The increments, transmitted in a coded form, are counted, after filtering and decoding, in counters placed on the vessel. If n phase shift increments have been transmitted from the immersed beacon before the pilot or the automatic piloting device have actuated the vessel propelling means, it suffices, for returning the vessel to its initial position to drive the same along lines determined with respect to the sensors and in such directions that the phase shift increments, during this motion, have signs opposite to those generated by the previous vehicle drift with respect to its initial position.

The modulation frequencies $f_1, f_2 \ldots f_8$ are so selected that they remain different from one another even when subjected to the Doppler effect due to the vessel motion with respect to the retransmitting transducer 3.

It would not be out of the scope of the invention to replace the coding with eight separate frequencies by a coding obtained by associating to each of the positive or negative increments produced by any one of detectors 13, a specific combination of several signals of different frequencies modulating a carrier signal or directly transmitted.

In the latter case the modulator will be replaced by a signal adder.

FIG. 3 illustrates the case where the vessel moves in the plane defined by three pressure sensors $h_1$, $h_2$ and $h_3$, respectively located at three apices of a frame shaped as a triangle A B C.

In FIG. 3 :

$\theta$ is the angle formed between the direction of the ultra-sonic waves emanating from the vessel and the horizontal direction, Bp is an axis parallel to said direction, Bq is an axis perpendicular to axis Bp, X, Y and Z represent the respective distances BC, CA and AB, $\alpha$, $\beta$ and $\gamma$ are the oriented angles (AB, CA), (BC, AB) and (CA, BC) and $\lambda$ is the wave length of the pressure waves in water.

The phase shifts $\phi$ AB, $\phi$ BC, $\phi$ CA of the waves arriving at the sensor pairs, respectively $h_1$ and $h_2$, $h_2$ and $h_3$, $h_3$ and $h_1$ are very easy to determine and can be expressed as follows :

$$\phi_{BC} = 2\pi (X/\lambda) \cos \theta \quad (1)$$

$$\phi_{CA} = 2\pi (Y/\lambda) \cos (\alpha = \beta - \theta) \quad (2)$$

$$\phi_{AB} = 2\pi (Z/\lambda) \cos (\beta - \theta) \quad (3)$$

To phase shift increments $\Delta\phi_{BC}$, $\Delta\phi_{CA}$, $\Delta\phi_{AB}$ correspond the respective variations $\Delta\theta_{BC}$, $\Delta\theta_{CA}$, $\Delta\theta_{AB}$, which can be expressed, in view of the preceding relationships (1), (2) and (3), as follows :

$$\Delta\theta_{BC} = (-1/2\pi)(\lambda/X)(\Delta\phi_{BC}/\sin\theta) \quad (4)$$

$$\Delta\theta_{CA} = (1/2\pi)(\lambda/Y)(\Delta\phi_{CA}/\sin(\alpha + \beta - \theta)) \quad (5)$$

$$\Delta\theta_{AB} = (1/2\pi)(\lambda/Z)(\Delta\phi_{AB}/\sin(\beta - \theta)) \quad (6)$$

In practice, for sake of simplicity $X$ is chosen equal to $Z$, $\beta$ equal to 90° and $\alpha$ equal to 45°.

The relationship (4), (5) and (6) are thus simplified and can be written :

$$\Delta\theta_{BC} = (-\lambda/h)(\Delta\phi_{BC}/\sin\theta) \quad (7)$$

$$\Delta\theta_{CA} = \frac{\lambda}{h\sqrt{2}} \frac{\Delta\phi_{CA}}{\sin\left(\frac{3\pi}{4} - \theta\right)} \quad (8)$$

$$\Delta\theta_{AB} = (\lambda/h)(\Delta\phi_{AB}/\cos\theta) \quad (9)$$

h being the common value for $X$ and $Z$.

It is apparent from relationships (7), (8) and (9) that the only knowledge of the angular quadrant in which is the angle $\theta$ makes it possible to determine the proportionality coefficients between the variations $\Delta\theta$ and the phase variations $\Delta\phi$ and consequently to determine the direction of the vessel motion from the accrued number of phase increments.

There would thus be obtained relationsiips identical to (7), (8) and (9) determining the variations $\Delta\psi$ of the angle formed between the direction of arrival of the waves and the axis passing through the sensors $h_1$ and $h_4$ in the plane containing the pressure sensors $h_1$, $h_2$, $h_4$ (FIG. 1).

On considering FIG. 4, it can be seen that to a displacement NN' of the vessel at the surface, correspond respective variations $\Delta\theta$ and $\Delta\psi$ of angles $\theta$ and $\psi$ in the two perpendicular planes determined by the sensors $h_1$, $h_2$, $h_3$ and $h_4$, in the particular case where angle $\beta$ is 90°. Let I and II be the respective quadrants for which angle $\theta$ is lower or greater than 90° and angle $\psi$ is lower than 90° and III and IV be the respective quadrants wherein angle $\theta$ is greater or lower than 90° and angle $\psi$ is greater than 90°. The determination of the quadrant in which the vessel moves is obtained by driving it along a closed loop around the estimated position of beacon 2.

The passage of the vessel from the first to the second quadrant, for example, results in a change of the sign of the phase shift increments $\Delta\phi_{AB}$ (equation 9). It is thus possible to establish in a simple manner the azimuths of the directions formed by the sensor pairs $h_2$, $h_3$ and $h_2$, $h_4$ and to know in what quadrant the vessel is stopped.

The quadrant may be determined, for instance by logic combinatory analysis, from the phase increments $\Delta\phi$.

The carrying out of the first embodiment of method is simplified when the beacon 2 can be placed so that the plane containing the sensors $h_2$, $h_3$ and $h_4$ be horizontal (FIG. 1). In such case, three sensors such as $h_2$, $h_3$ and $h_4$ are sufficient for determining the sense of the variations of $\theta$ and $\psi$ as a function of the signs of the phase increments $\Delta\phi$.

FIG. 5 illustrates, in the general case, the network of lines of equal phase differences obtained at the sea surface by composition of electric signals generated by any two combinations of immersed pressure sensors. When the vehicle passes through any of these lines, the counters of increments display the quantified variations of the phase differences. When the vehicle is displaced by the effect of currents, e.g. from an origin point E to a point F, it traverses, according to FIG. 5, lines $q_1$, $q_2$ ... $q_6$ and lines $p_2$, $p_2$ ... $p_5$ respectively corresponding to six and five phase increments along two different directions. In order to come back to its initial position, the vessel must be driven along a travel path so determined as to nullify the accrued phase increments along EF.

This travel path may be chosen at will and comprise for example a displacement EG along $q_6$ so as first to nullify the phase increments in one direction and then a further displacement along line $p_0$ so as to nullify the increments in the other direction.

In most cases it can be shown that a combination of the electric signals produced by two different pairs of sensors is not sufficient for establishing an easily workable line network.

When the water body is deep, the two sets of lines forming this network become quickly curved when the distance from the vertical line passing through the pairs of sensors increases. The magnitude and the orientation of the network meshes changing quickly, the design of the device making use of the phase increments becomes quickly very complex.

The second embodiment of the method consists of placing the pressure sensors close to one another and of combining in a particular manner the electric signals produced therewith so as to form a network of lines of equal phase differences consisting of two sets of curves whose intersection angles are stable over a large surface around the position of the sensors.

In the above-described embodiment a particular arrangement of the pressure sensors provides for a network of lines of equal phase differences formed of two sets of rectilinear orthogonal lines with a constant spacing therebetween over a substantial length.

As shown in FIG. 6, the immersed device comprises four pressure sensors M, P, Q and R. Three of them e.g P, Q and R are placed on the carrier at the apices of an isosceles triangle. The fourth sensor M is placed at the middle of the segment joining QR.

In the following the common distance between sensor M and the three sensors P, Q and R is represented as s and the vehicle coordinates with respect to two orthogonal axes parallel to directions PM and QR and whose intersection point is in the vertical line passing through M, are represented as $x$ and $y$. Further distances from point N to the respective four hydrophones M, P, Q and R are represented as $dM$, $dP$, $dQ$ and $dR$ and the vertical distance between the vehicle and the plane containing the four sensors is represented as Z.

A transmitting transducer, similar to transducer 1 of FIG. 1, transmits in a continuous manner acoustic waves at a steady frequency, which waves are received by the sensors and converted to electric signals.

Assuming that the wave transmitted from the vessel has the form:

$$e(t) = \cos 2\pi f t \tag{10}$$

the amplitudes of the waves $2_M(t)$, $2_P(t)$, $r_Q(t)$ respectively received at the sensors M, P, Q and R are, after leveling of their amplitudes, of the form:

$$r_M(t) = \cos 2\pi (ft + d_M/\lambda) \tag{11}$$

$$r_P(t) = \cos 2\pi (ft + d_P/\lambda) \tag{12}$$

$$r_Q(t) = \cos 2\pi (ft + d_Q/\lambda) \tag{13}$$

$$r_R(t) = \cos 2\pi (ft + d_R/\lambda) \tag{14}$$

The signal combinations whereby can be obtained a stable network of lines of equal phase, are achieved in accordance with the following relationships:

$$BF \{HF (r_P \cdot r_Q) \cdot HF (r_M r_M)\} \tag{15}$$

and $$BF \{HF (r_P \cdot r_R) \cdot HF (r_M r_M)\} \tag{16}$$

wherein $r_P r_Q$ and $r_P r_R$ are the products of signal $r_P$ by signals $r_Q$ and $r_R$ respectively, $r_M r_M$ is the product of signal $r_M$ by itself and $HF$ and $BF$ are respectively the high frequency components and the low frequency components of the achieved products.

It can be readily established that:

$$HF (r_p \cdot r_Q) = \cos 2\pi[2 ft + (dP + dQ)/\lambda] \tag{17}$$

$$HF (r_M \cdot r_M) = \cos 2\pi[2 ft + (2d_M/\lambda)] \tag{18}$$

$$HF (r_P \cdot r_R) = \cos 2\pi[2 ft + (d_P + d_R)/\lambda] \tag{19}$$

and that the combination of signals in accordance with relationships (15) and (16) will result in the following phase relationships:

$$\cos \psi_{PQM} = \cos 2\pi (dP + dQ - 2d_M)/\lambda \tag{20}$$

$$\cos \psi_{PRM} = \cos 2\pi (dP + dR - 2d_M)/\lambda \tag{21}$$

wherein $\psi_{PQM}$ and $\psi_{PRM}$ are the phases of the signals resulting from these combinations. All the variations of these phases whose value is a multiple of $2\pi$ radian are detected. It follows that the variations of the sums $d_P + d_Q - 2 d_M$ and $d_P + d_R - 2 d_M$ are respectively equal to $l\lambda$ and $M\lambda$ ($\lambda$ being the wave length of the transmitted waves and l and m being integers). The lengths $d_M$, $d_P$, $d_Q$ and $d_R$ can be easily determined on the figure and result from the relationships:

$$d_M^2 = x^2 + y^2 + Z^2 \tag{22}$$

$$d_P^2 = Z^2 + x^2 + y^2 + h^2 + 2xs \tag{23}$$

$$d_Q^2 = Z^2 + x^2 + y^2 + h^2 + 2ys \tag{24}$$

$$d_R^2 = Z^2 + x^2 + y^2 + h^2 - 2ys \tag{25}$$

In view of the relatively small value of the displacements $x$ and $y$ and of the length $s$ as compared to the depth $Z$ of the water body, the lengths $d_M$, $d_P$, $d_Q$ and $d_R$ can be expressed with a good approximation as follows:

$$d_M \approx Z + (x^2 + y^2)/2Z \tag{26}$$

$$d_P \approx Z + (x^2+y^2/2Z) + (s^2/2Z) + (xs/Z) \tag{27}$$

$$d_Q \approx Z + (x^2 + y^2/2Z) + (s^2/2Z) + (ys/Z) \tag{28}$$

$$d_R \approx Z + (x^2 + y^2/2Z) + (s^2/2Z) - (ys/Z) \tag{29}$$

The sums $d_P + d_Q - 2 d_M$ and $d_P + d_R - 2 d_M$ may thus be written as:

$$d_P + d_Q - 2 d_M = (s/Z)(s + x + y) = l\lambda \tag{30}$$

$$d_P + d_R - 2 d_M = (s/Z)(s + x - y) = m\lambda \tag{31}$$

The relationships (30) and (31) make apparent the fact that the lines of equal phase differences are formed at the sea surface and, when $l$ and $m$ vary, consist of two sets of orthogonal straight lines inclined by 45° on axes PM and MR, as shown in FIG. 8.

From the same relationships there can be deduced that the spacing $\Delta$ between the lines of said network is constant and equal to $\lambda Z/S \sqrt{2}$. The inclination of 45° is due to the particular respective locations of the four sensors. The inclination of the straight lines of the network may however be varied by varying the distance $P_M$. Referring to FIG. 7, the electric signals produced by the sensors $h_M$, $h_P$, $h_Q$ and $h_R$ located at respective joints M, P, Q and R, are amplified in amplifier-limiters, respectively 18, 19, 20 and 21. These signals are then treated in accordance with relationships (15) and (16). The signal produced by $h_P$ is multiplied with the signals produced by $h_Q$ and $h_R$ in balanced modulators, respectively 22 and 23 (cf. relationships (17) and (19).

The signal issued from sensor $h_M$ is multiplied by itself in modulator 24 (cf. relationship 18). The output terminals of modulators 22, 23 and 24 are connected to high pass filters, respectively 25, 26 and 27, which eliminate the low frequency components of the achieved products.

The signal produced by filter 27 is multiplied respectively by the signals issued from filters 25 and 26, in other balanced modulators 28 and 29.

The output terminals of the latter are connected to low-pass filters, respectively 30 and 31, which eliminate the high frequency components of the multiplied signals.

Filters 30 and 31 are respectively connected to phasemeters 32 and 33 formed by detectors of the passage to a zero value of the signal amplitude and detectors of the direction of variation of said amplitude at these passages, similar to elements 12 and 13 of FIG. 2.

These phasemeters 32 and 33 deliver, at one output, a pulse, at each time when the phase of the combined signals increases by $2\pi$ and, at a second output, a pulse at each time when the phase of the combined signals decreases by $2\pi$.

The device also comprises a coding assembly similar to assembly L of FIG. 2. In this second embodiment the coding is performed more simply from four separate frequencies each associated to the pulses produced at one of the four output terminals of phasemeters 32 and 33.

The device further comprises, as well as that shown in FIG. 2, a power amplifier 17 associated to a transducer transmitting coded acoustic waves 3.

The second embodiment of the method and the associated device have been described on the basis of the assumption that the combined phase shift variations were converted to phase increments of $2\pi$. In order to obtain a better accuracy, the detected phase shift variations may be converted to increments of $2\pi/K$ ($K$ being an integer).

In such a case, the relationships (30) and (31) may be written:

$$d_P + d_Q - 2d_M + (s/2)(h + x + y) = l\lambda/K \tag{32}$$

$$d_P + d_R - 2d_M = (s/2)(h + x + - y) = m\lambda/K \tag{33}$$

The spacing $\Delta$ between the lines of equal phase differences is thus equal to $(\lambda/K)(Z/S \sqrt{2})$.

The vessel position is thus determined with a greater accuracy.

FIG. 9 shows an improved embodiment of the device for increasing the accuracy, according to which there have been placed on the vertical lines passing through each point M, P, Q, R, a number of pressure sensors vertically spaced from each other at a distance $\lambda/K$ ($K$ being five in the figure).

The electric signals emanating from the sensors placed at the same level (e.g. $h_{Q_1}, h_{M_1}, h_{P_1}, h_{R_1}$) are combined according to relationships (15) and (16) in a device similar to that of FIG. 7. The signals generated at the levels of the planes containing the sensors $h_{Q_1}, h_{Q_2}, h_{Q_3}, h_{Q_4}, h_{Q_5}$ are delayed with respect to one another by $2\pi/k$, in view of their different distances from the transmitter on board.

Filters 30 and 31 of each device are respectively connected to two phasemeters 32 and 33 through OR gates, not shown.

Phasemeters 32 and 33 (FIG. 7) are connected to a coding assembly L containing means for pulse-coding by sub-carrier frequencies in number 2 K.

FIG. 10 shows another improved device for increasing the measurement accuracy.

The device comprises four sensors $h_M$, $h_P$, $h_Q$ and $h_R$ connected to four amplifiers 18, 19, 20 and 21 and two circuits similar to that shown in FIG. 7 connected in parallel at the output of the amplifiers.

The first of these circuits is directly connected to the amplifiers output through conductors 181, 191, 201 and 211. The second is connected to said amplifiers through phase shifters $R_1$, $R_2$, $R_3$ and $R_4$ producing a 180° phase shift of the amplified signals. The direct signals emanating from sensors $h_P$ and $h_Q$ on one hand and the delayed signals emanating from the same sensors are respectively multiplied in modulators 221 and 222, and then filtered through high pass filters 251 and 252. In the same way, direct and delayed signals emanating from sensors $h_P$ and $h_R$ are respectively multiplied in modulators 231 and 232 and then filtered through high pass filters 261 and 262. The direct signals issued from sensor $h_M$ and the same signals, but delayed, are respectively multiplied by themselves in modulators 241 and 242 and then filtered in the high pass filters 271 and 272. The signals issued from filters 271 and 272 are respectively multiplied by the signals issued from filters 251 and 252, in modulators 281 and 282, and then filtered through low-pass filters 301 and 302 on the one hand, and respectively multiplied by the signals issued from filters 261 and 262, in modulators 291 and 292, and then filtered through low-pass filters 311 and 312, on the other hand. The output terminals of filters 301 and 302 are connected to the input terminal of phasemeter 32 through an OR gate 34. Similarly the output terminals of filters 311 and 312 are connected to the input terminal of phasemeter 33. The pulses issued from these phasemeters are then coded in the coding assembly L and thereafter retransmitted to the vessel by the pressure trasducer 3 after amplification in element 17.

The above-described device gives phase increments of in a number which is twice that given by the device of FIG. 7. This doubling of the increments number results at the sea surface in a network of lines of equal phase differences having a constant line interspace of $\Delta/2$ (cf FIG. 8). This results in a greater accuracy in the determination of the vessel position.

It is possible to increase the accuracy of the measurement and to reduce the spacing between the lines of equal phase by selecting K greater than 2 or by multiplying the number of phase shifters at the output of each amplifier 18, 19, 20 and 21. By way of example, FIG. 10 A shows the particular arrangement of three phase shifters at the amplifier output 20. Three phase shifters $R_{31}$, $R_{32}$, and $R_{33}$, in cascade arrangement, successively delay the direct signal by 90°, 180° and 270°. The device will comprise four parallel circuits for combining the direct signals and the signals delayed by $\pi/2$, $\pi$ and $3\pi/2$.

FIG. 8 illustrates the preferred process for determining the direction of two sets of orthogonal phase lines. The vessel is driven along a travel path IJ with a constant heading, preferably towards the north, between an initial position and an arrival position which can be any one. During its displacement there are noted the respective numbers $l$ and $m$ of lines parallel to axes $\alpha\alpha'$ and $\beta\beta'$ traversed by the vessel. The angle $\gamma_c$ formed between IJ and the direction PM is given by the relationship:

$$t_g\gamma = (l - m/l + m) \tag{34}$$

When the travel path is oriented towards the north, there is directly obtained the azimuth of axis PM of the immersed hydrophone set.

The vessel coordinates may be determined in a computer-coordinate changer of a known type on the basis of the number of the pulses received after decoding through filters whose band pass is centered on the coding frequencies and also on the basis of the values of angle $\gamma_c$ and of the heading given by a compass.

The second embodiment of the method has been described with reference to the particular case where the pressure sensors are placed on a carrier at three apices of a square. It would however not be out of the scope of the invention to place at least four sensors at any place in the vicinity of the immersed reference point and to combine the signals produced by at least two pairs of sensors having one common sensor with the signals produced by a reference sensor.

The two described embodiments may also be associated so as to decrease the spacings between the lines or curves of the network of equal phase difference lines.

More generally it is apparent that, from the foregoing description, one skilled in the art can easily ascertain the essential characteristics of the invention and, without departing from the spirit and scope thereof, can make various changes and modifications of the invention to adapt it to various usages and conditions. Consequently, such changes and modifications are properly, equitably and intended to be within the full range of equivalence of the following claims.

What we claim is :

1. A method for determining the distance, from a pre-selected point, of a vehicle moving in a water body, in the vicinity of said preselected point which is defined with respect to a reference location of the bottom of the water body where are placed several pressure sensors in a predetermined position with respect to one another, said method comprising the steps of :

a. transmitting acoustic waves in a continuous manner from the vehicle and receiving the same at said pressure sensors, b. detecting the continuous variations of the phase differences between the waves received by said sensors, said variations resulting from the displacements of the vehicle in the vicinity of the preselected point, by combination of electric signals issued from at least one set of sensors comprising at least two pairs of sensors having one common sensor, the directions formed by these two pairs being not in alignment, c. converting said continuous variations to a series of phase shift increments of constant value, and d. transmitting, in form of coded acoustic waves, the number of said increments to a counter placed on the vehicle, which indicates the magnitude and the direction of the distances of the vehicle from the preselected point.

2. A method according to claim 1 wherein the code for transmitting said increments is formed by associating to the phase increments resulting from each combination of signals, of one of an electric signal of determined frequency and an electric signal formed by a specific combination of several signals of different frequencies.

3. A method according to claim 1, wherein the set of sensors comprises four sensors forming the apices of a trihedral
and said combination is performed separately for four pairs of sensors taken in the set of sensors.

4. A method according to claim 3 wherein the sensors are positioned along three orthogonal directions.

5. A method for determining the distance, from a preselected point, of a vehicle moving in a water body, in the vicinity of said preselected point, which is defined with respect to a reference location of the bottom of the water body where is placed a set of pressure sensors in a predetermined position with respect to one another, said method comprising the steps of:
   a. transmitting acoustic waves in a continuous manner from the vehicle and receiving them by means of said set of sensors at four sensor positions, each position comprising K sensors placed substantially along a vertical direction, the sensors of a level being in a substantially horizontal plane, K being any integer,
   b. detecting the continuous variations of the phase differences in the waves received by the sensors, said variations resulting from the displacements of the vehicle in the vicinity of the preselected point, by combination, at each level of the signals issued respectively from two pairs of sensors of said level which are not in line and have a common sensor, with the signals issued from a reference sensor,
   c. converting said continuous variations to phase shift increments of constant value, and
   d. transmitting, in a coded form, the number of said increments to a counter, placed on the vehicle, which indicates the magnitude and the direction of the distances of the vehicle from the preselected point.

6. A method according to claim 5 wherein the step of detecting comprises the combination of said signals issued from the sensors directly and with convenient delays.

7. A method according to claim 5 wherein said reference sensor is in alignment with the two non-common sensors of the two pairs of sensors at each level.

8. A method according to claim 7 wherein the sensors forming the two pairs are placed at three apices of a square and the reference sensor at equal distances from the two non-common sensors.

9. A method according to claim 5 wherein $K$ is one.

10. A method according to claim 5 wherein the signals from the sensors at each level are combined according to the relationships:

$$BF\{HF(r_P \cdot r_Q) \cdot HF(r_M \cdot r_M)\} \text{ and}$$
$$BF\{HF(r_P \cdot r_R) \cdot HF(r_M \cdot r_M)\}$$

wherein $r_P$ is the signal issued from the common sensor, $r_Q$ and $r_R$ are the signals issued from the non-common sensors of the two pairs, $r_M$ is the signal issued from the reference sensor and BF and HF respectively indicate the low frequency and high frequency components of the obtained signal products.

11. A method according to claim 7 wherein the vehicle positions, for which the successive values of the phase shifts resulting from said combinations are varied by increments, are in line and form at least two intersecting sets of parallel lines.

12. A method according to claim 11 wherein said two sets of parallel lines are orthogonal.

13. A method according to claim 12 wherein the angle formed between a rectilinear travel path followed by the vehicle and the direction of said alignment of the sensors, is determined by counting the number of lines of each set traversed by the vehicle moving from a starting position to a position of arrival.

14. A device for determining the distance, from a preselected point, of a vehicle moving in a water body, in the vicinity of the preselected point which is defined with respect to a reference location at the bottom of the water body where pressure sensors are placed in a predetermined position with respect to one another and where acoustic waves are transmitted from the vehicle and received at the pressure sensors, said device comprising at least one set of said pressure sensors, means associated with said at least one set of pressure sensors for combining signals issued from at least one pair of said sensors, means for detecting the phase shift variations of these signals combinations, means for converting the continuous variations of the phase shifts, for each combination of signals, to electric pulses of quantified value, a coding assembly comprising means for producing coding signals, means for associating each coding signal to the pulses according to their sign, for each combination of signals, and acoustic means for transmitting the coding signals to a counter placed on said vehicle.

15. A device according to claim 14 wherein the coding assembly comprises means for producing signals of different frequencies.

16. A device according to claim 14 wherein the coding assembly comprises means for producing different specific frequency combinations.

17. A device according to claim 14 wherein said at least one set of sensors includes two pairs of of non-aligned sensors having one common sensor and the means for performing the combination of signals comprise elements of combination of the signals issued from the sensors of one of the pairs, elements of combination of the signals issued from the sensors of the second pair, elements of combination of the signal issued from the reference sensor with itself, filtering elements eliminating the low frequency components from the signals issued from the combination elements, means for combining the signals issued from that filtering element which is connected to said elements of combination of the signal issued from the reference sensor with itself, respectively with the signals issued from the other filtering elements, and filtering elements eliminating the high frequency components from the signals issued from said means for combining.

18. A device according to claim 17 comprising a plurality of means for performing the combination of signals, connected respectively to said sensors through a plurality of phase changing elements for delaying the signals by increasing phase intervals.

* * * * *